(12) United States Patent
Jia et al.

(10) Patent No.: US 11,184,824 B2
(45) Date of Patent: Nov. 23, 2021

(54) WIRELESS DEVICE UPGRADE

(71) Applicant: Hewlett Packard Enterprise Development LP, Houston, TX (US)

(72) Inventors: Xuguang Jia, Beijing (CN); Guangzhi Ran, Beijing (CN); Qiang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 52 days.

(21) Appl. No.: 16/256,920

(22) Filed: Jan. 24, 2019

(65) Prior Publication Data
US 2020/0245212 A1    Jul. 30, 2020

(51) Int. Cl.
| | |
|---|---|
| *H04W 36/18* | (2009.01) |
| *H04W 36/08* | (2009.01) |
| *H04W 88/18* | (2009.01) |
| *G06F 8/65* | (2018.01) |
| *H04L 12/24* | (2006.01) |
| *H04W 88/12* | (2009.01) |
| *H04W 24/04* | (2009.01) |

(52) U.S. Cl.
CPC .............. *H04W 36/18* (2013.01); *G06F 8/65* (2013.01); *H04L 41/0668* (2013.01); *H04L 41/082* (2013.01); *H04W 36/08* (2013.01); *H04W 88/12* (2013.01); *H04W 88/182* (2013.01); *H04W 24/04* (2013.01)

(58) Field of Classification Search
CPC ... H04W 36/18; H04W 88/182; H04W 36/08; H04W 88/12; H04W 24/04; H04L 41/0668; H04L 41/082; G06F 8/65
See application file for complete search history.

(56) References Cited

U.S. PATENT DOCUMENTS

| | | |
|---|---|---|
| 8,885,539 B2 | 11/2014 | Trudeau et al. |
| 8,943,489 B1 | 1/2015 | Qu |
| (Continued) | | |

FOREIGN PATENT DOCUMENTS

| | | |
|---|---|---|
| CN | 101529762 | 9/2009 |
| CN | 106130808 | 11/2016 |

OTHER PUBLICATIONS

Cisco Wireless Controller Configuration Guide, Release 8.2, (Web Page), Oct. 2, 2018, 18 Pgs.

*Primary Examiner* — Jeffrey M Rutkowski
*Assistant Examiner* — Chae S Lee
(74) *Attorney, Agent, or Firm* — Sheppard Mullin Richter & Hampton LLP

(57) ABSTRACT

Systems and methods are provided for upgrading wireless network devices, such as access points (APs). When a first AP needs an upgrade, a network controller of the first AP may identify and select a neighbor AP. The radio(s) of the neighbor AP can be split into multiple logical radios, at least one of which includes a backup virtual AP (VAP). The backup VAP can support client devices originally supported by the first AP, allowing those client devices to roam to the neighbor AP while the first AP is upgrading, and without needing to re-associate with the neighbor AP. From the client device perspective, it appears as though they are still being supported by the first AP. Upon upgrading the first AP, the client devices can roam back to the first AP (without needing to re-associate with the first AP). No downtime is experienced, and no RF holes are generated.

18 Claims, 14 Drawing Sheets

(56) References Cited

U.S. PATENT DOCUMENTS

| | | | |
|---|---|---|---|
| 9,021,459 B1* | 4/2015 | Qu | G06F 8/65 710/33 |
| 2008/0084855 A1 | 4/2008 | Rahman | |
| 2008/0123553 A1* | 5/2008 | Boyina | H04W 24/04 370/254 |
| 2012/0271797 A1* | 10/2012 | Patil | G06F 16/1824 707/639 |
| 2013/0191340 A1* | 7/2013 | Ammanur | G06F 11/14 707/638 |
| 2014/0344424 A1* | 11/2014 | Sato | G06F 9/45558 709/221 |
| 2015/0117180 A1* | 4/2015 | Gupta | H04L 41/0663 370/221 |
| 2015/0281054 A1* | 10/2015 | Utgikar | H04L 49/351 709/221 |
| 2015/0373561 A1 | 12/2015 | Huang et al. | |
| 2018/0115918 A1 | 4/2018 | Arjun et al. | |
| 2019/0174383 A1* | 6/2019 | Zhang | H04W 36/08 |
| 2019/0317820 A1* | 10/2019 | Abdulla | G06F 9/5044 |

* cited by examiner

WIRELESS DEVICE UPGRADE

DESCRIPTION OF RELATED ART

In some computing networks, access points (APs) may provide network connectivity to client devices. These APs may be associated with controllers. The APs and the controllers may work together to provide redundancy in the event that one of the APs and/or one of the controllers fails. For example, if one controller or AP fails, another controller or AP may provide network connectivity to a client device so that the client device does not experience an interruption in network connectivity.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
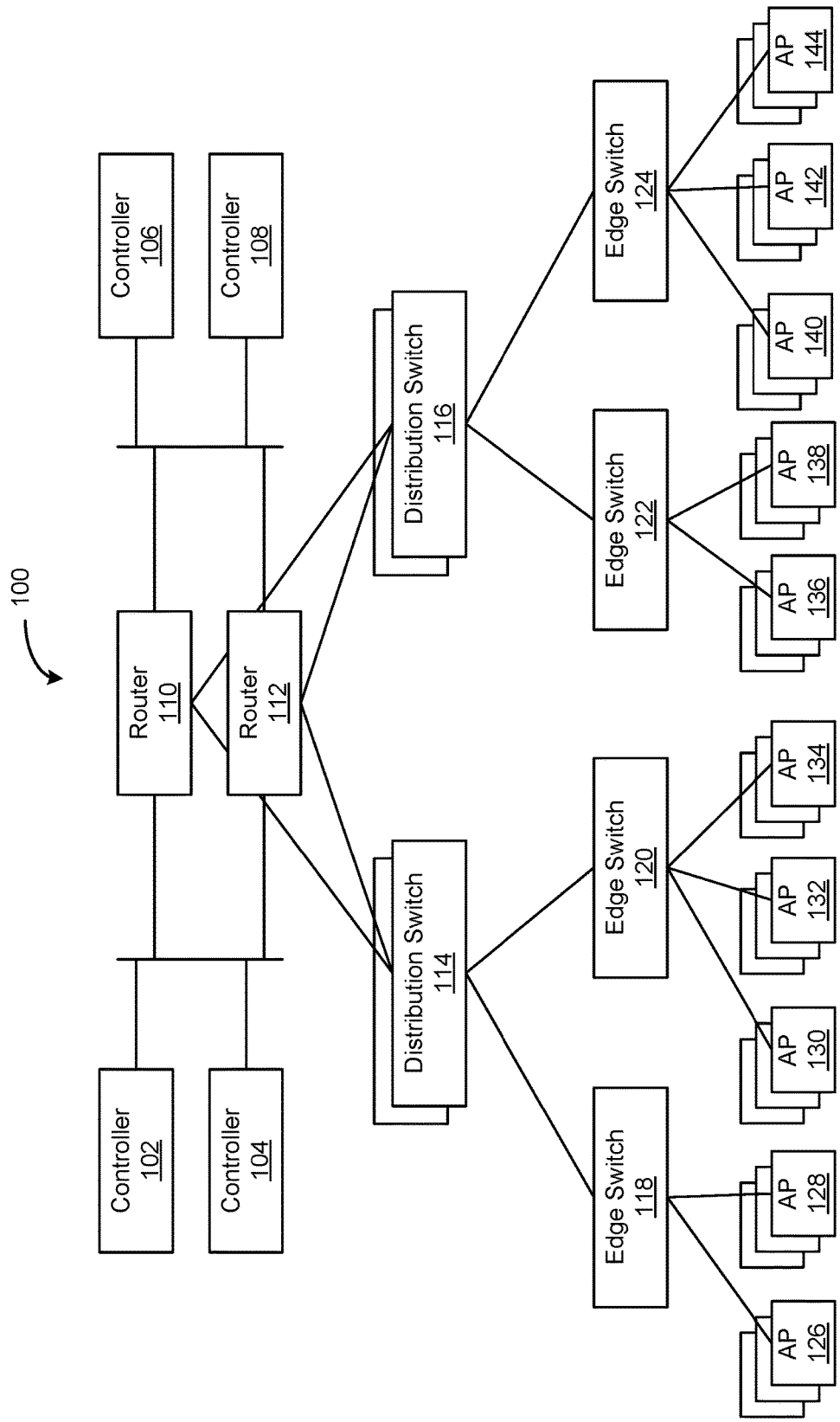
FIG. 1 illustrates an example wireless network deployment in which seamless wireless device upgrading without downtime can be implemented in accordance with various embodiments.

The figures are not exhaustive and do not limit the present disclosure to the precise form disclosed.

DETAILED DESCRIPTION

Upgrading controllers and/or APs in a computing network, such as a wireless computing network or network deployment, may involve scheduling a maintenance window for upgrades to those controllers and/or AP instructions. The maintenance window may involve a network connectivity outage for client devices. For example, taking an AP offline can create a gap or hole in coverage (also referred to as a radio frequency (RF) hole), i.e., coverage for an area within which the AP provides connectivity to client devices, can be lost while the AP is being upgraded. The downtime due to the network connectivity outage my last anywhere from several minutes to several hours (or more), keeping client devices from accessing the computing network.

Accordingly, various embodiments disclosed herein are directed to systems and methods for upgrading wireless devices, such as APs or similar devices. Various embodiments may leverage the ability of AP radios to support flexible operating modes. That is, certain (modern) AP radios are able to support the splitting of radio chains. An AP radio that can support, e.g., the 802.11ax standard, is one such example. Unlike other conventional systems and methods of upgrading wireless devices, the embodiments disclosed herein avoid downtime, avoid the creation of RF holes, and avoid the need for a client device to roam (conventionally, i.e., by re-association) to another AP.

In particular, a neighbor AP (an AP that neighbors another AP due to be upgraded) is selected by a controller, and the neighbor AP's radio may be split into two or more radios. A backup virtual AP (VAP) can be created on a secondary radio into which the AP radio of the neighbor AP has been split. The backup VAP will synchronize relevant information (e.g., configuration and state information) with an active VAP implemented on the AP to be upgraded. The backup VAP may listen to network traffic to determine a current or latest state (e.g., 802.11 state) of the active VAP, and any connected client devices. A current or latest state of the active VAP can include information such as, but not limited to beacon timestamps, traffic identifier (TID) sequence numbers, packet numbers (PNs), etc.

The controller may then take down the active VAP (of the AP to be upgraded) to perform an image upgrade, and the backup VAP can be fully activated. Upon activation, the backup VAP can work from the current or latest state of the active VAP prior to being taken down. The backup VAP can transmit beacons, as well as transmit frames to/receive frames from one or more client devices. The one or more client devices need not be aware that they are being provided service/connectivity through the backup VAP. That is, there is no break in the aforementioned state information (e.g., beacon timestamp, sequence number of each TID, PN, etc.). From the client device perspective, it appears as though the active VAP (of the AP being upgraded) is active or operational. When the upgrade to the AP is complete, the active VAP of the upgraded AP can be activated again, the backup VAP will become silent again, and the active VAP can continue to provide service to its client devices. It should be noted that throughout this procedure, the client device maintains its associated state and the transmission/receipt of traffic is not interrupted.

FIG. 1 illustrates an example wireless network 100 in which various embodiments may be implemented. Wireless network 100 may include one or more controllers, e.g., controllers 102, 104, 106, and 108. Each of these controllers may, for example, refer to any suitable entity that handles control and management functions of a computing network or equipment thereof, such as wireless network 100 and its component parts. For example, one or more of controllers 101-108 may be physical/hardware controllers or devices, or one or more of controllers 101-108 may be virtual controllers or devices operating in wireless network 100 or as cloud-based controllers/devices. Controllers 101-108 can be used to control one or more aspects of APs 126-144, such as channel assignment, beamforming, radio resource management (RRM), etc. In some implementations (i.e., when one or more of controllers 101-108 are embodied as virtual controllers), applications can run on one or more controllers 102-108 or on other devices in wireless network 100 (or otherwise in communication with wireless network 100) to meet customer use cases. Such use cases may include, but are not limited to achieving a desired throughput (or another Quality of Service (QoS)) over wireless network 100, enforcing security provisions or access control policies for wireless network 100, or providing another suitable service or functionality.

As another example, multiple controllers, e.g., controllers 102-108, can be used to work together to concurrently control certain networks. For example, in wireless network 100, a first controller, e.g., controller 102, can control certain network devices, such as APs 126 and 128, while a second controller, e.g., controller 104, can control other network devices, such as APs 130-134. As will be described in greater detail below, controllers, such as controllers 102-108 may facilitate the upgrading of APs, such as one or more of APs 126-144.

Wireless network 100 may also include one or more routers 110 and 112. Routers are typically network devices that forward data packets along networks, meaning routers usually connect to at least two networks. In the case of FIG. 1, routers 110 and 112 may connect wireless network 100 to another network, such as a local area network (LAN), wide area network (WAN), the Internet, etc. For example, each of routers 110 and 112 may be a Layer 3 network gateway device used to connect two or more computing networks, e.g., wireless network 100 to the Internet, thereby providing Internet access to a client device operating in or through wireless network 100. Routers may typically include a processor, one or more memory units, and one or more input-output (I/O) interfaces. In the example of wireless network 100, controllers 102 and 106 communicate through router 110, and controller 104 and 108 communicate through router 112.

Each of routers 110 and 112 may further communicate with distribution switches 114 and 116. Switches generally refer to network devices that filter and forward packets between segments of a network, and may operate at the data link layer (Layer 2), and sometimes at the network layer (Layer 3). Switches can be access points to a network, such as wireless network 100. Each of distribution switches 114 and 116 may be operatively connected to one or more other components or infrastructure of wireless network 100 to effectuate packet communication. Each of distribution switches 114 and 116 may include uplink and downlink trunks with a switching stack containing multiple access switching units. In the example of wireless network 100, distribution switch 114 may be operatively connected to edge switches 118 and 120, while distribution switch 116 may be operatively connected to edge switches 122 and 124. Edge switches 118-124 can refer to switches (that use some form of packet switching to forward data to a destination) that act as an entry point to a core network, such as provider or enterprise network, to provide (usually high-speed) communication between wireless network 100 and the Internet.

As further illustrated in FIG. 1, wireless network 100 is configured such that edge switch 118 is operatively connected to APs 126 and 128, edge switch 120 is operatively connected to APs 130, 132, and 134, edge switch 122 is operatively connected to APs 136 and 138, and edge switch 124 is operatively connected to APs 140, 142, and 144. One or more client devices (not shown in FIG. 1), may receive service, e.g., connectivity to the Internet, by communicating through one or more of APs 126-144.

An AP generally refers to a networking device that allows a client device to connect to a wired or wireless network, in this case, wireless network 100. An AP can include a processor, memory, and I/O interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarchy of persistent memory such as ROM, EPROM, and Flash memory. Moreover, as used herein, an AP may refer to receiving points for any known or convenient wireless access technology which may later become known. Specifically, the term AP is not intended to be limited to IEEE 802.11-based APs.

As used herein, a client device refers to a device including a processor, memory, and I/O interfaces for wired and/or wireless communication. A client device may comprise a laptop computer, a desktop computer, a mobile device, and/or other wireless devices, although examples of the disclosure are not limited to such devices. A mobile device may refer to devices that are (or may be) carried and/or worn by a user. For instance, a mobile client device can be a phone (e.g., a smart phone), a tablet, a personal digital assistant (PDA), smart glasses, and/or a wrist-worn device (e.g., a smart watch), among other types of mobile devices.

As alluded to above, APs, such as APs 126-144 may need to updating or upgrading with respect to the APs operating system, firmware, etc. As also alluded to above, various embodiments described herein enable AP upgrades without downtime, without necessitating client device roaming, and without impacting the client devices' working environment(s). Updating an AP may involve a device image upgrade. However, performing a device image upgrade conventionally requires performing a hardware reboot after a new image is loaded onto the AP. Moreover, the time zones in which APs may be operating can differ (or simply that a time difference exists between different APs whose clocks are not necessarily synchronized). Further still, users of client devices may have to disconnect from an AP which those client devices are connected, find and/or perform auto-roaming to neighboring APs. Further still, RF holes may be identified if the number of client devices is large enough to detect a loss of coverage. However, if the number of client devices using/associated with an AP is not large, the existence of an RF hole may be missed, not to mention the greater the number of APs in a computing network, the more difficult it can be to detect/identify which of the APs in the computing network may be causing an RF hole. Additionally still, if an AP has client devices willing to connect to the AP, a user may have to locate an appropriate AP group and/or correct controller to determine a control path, as well as the data path in order to perform a seamless AP/wireless device upgrade.

In particular, conventional methods of upgrading wireless devices, such as APs, can be categorized into one of three methods, a "normal" upgrade, a "preload" upgrade, and a "rolling" upgrade. With a normal upgrade, a controller (referred to as C1 for ease of description) may be selected to receive a copy of a new image. The new image may be stored to C1's flash memory and reloaded. One or more APs (a group of APs) that recognize C1 as a master controller can discover the new image on C1. The one or more APs whose master controller is C1 may disconnect client device connections, perform the image upgrade, and reboot. This process may be repeated for other controllers/APs in the network. However, with a normal upgrade, although a relatively simple procedure, results in downtime, a loss of connectivity, and an RF hole(s).

With a preload upgrade, similar to the normal upgrade process, a controller within a network is selected (again referred to as C1), and a new image may be copied to its backup flash partition. C1 may then notify and instruct the group of APs recognizing C1 as its master controller to perform a new image preload upgrade without rebooting each AP within the group of APs. Preloading can refer to, e.g., loading upgraded images or instructions to an AP prior to upgrading the AP. C1 and the group of APs may then perform a time synchronized reload, during which time, client devices are not able to access the network until the basic service set (e.g., an AP connected to a wired network and a set of client devices) comes back online after a client device hardware reset. Although the preload upgrade method avoids AP downtime (by negating the need for a reboot), client connectivity is still lost during the update, and an RF hole issue can remain.

With a rolling upgrade, a controller within a network is selected (again referred to as C1), a new image may be copied to its flash memory, and a reload is performed. The group of APs that recognize C1 as their master controller will failover to a standby controller, C2. All the association information for client devices that were previously connected to an AP within the group of APs will failover to yet another standby controller, C3, where C2 and C3 may be different controllers. After C1 comes back online, it will find all APs in the group, and trigger a reboot of the APs. Upon rebooting, each AP in the group of APs communicates with C1, and updates to the new image. Client devices previously connected to each AP will be disconnected until the AP comes back online after rebooting, while high level connection information can be reloaded from C3. This rolling upgrade process can be repeated for additional controllers/APs in the network. However, the rolling upgrade process still has downsides. Although performing rolling upgrades can reduce downtime, and address client connectivity, nevertheless, because APs require a reboot, the RF hole issue remains if one or more AP groups perform their reboot at the same time.

Figure 2:
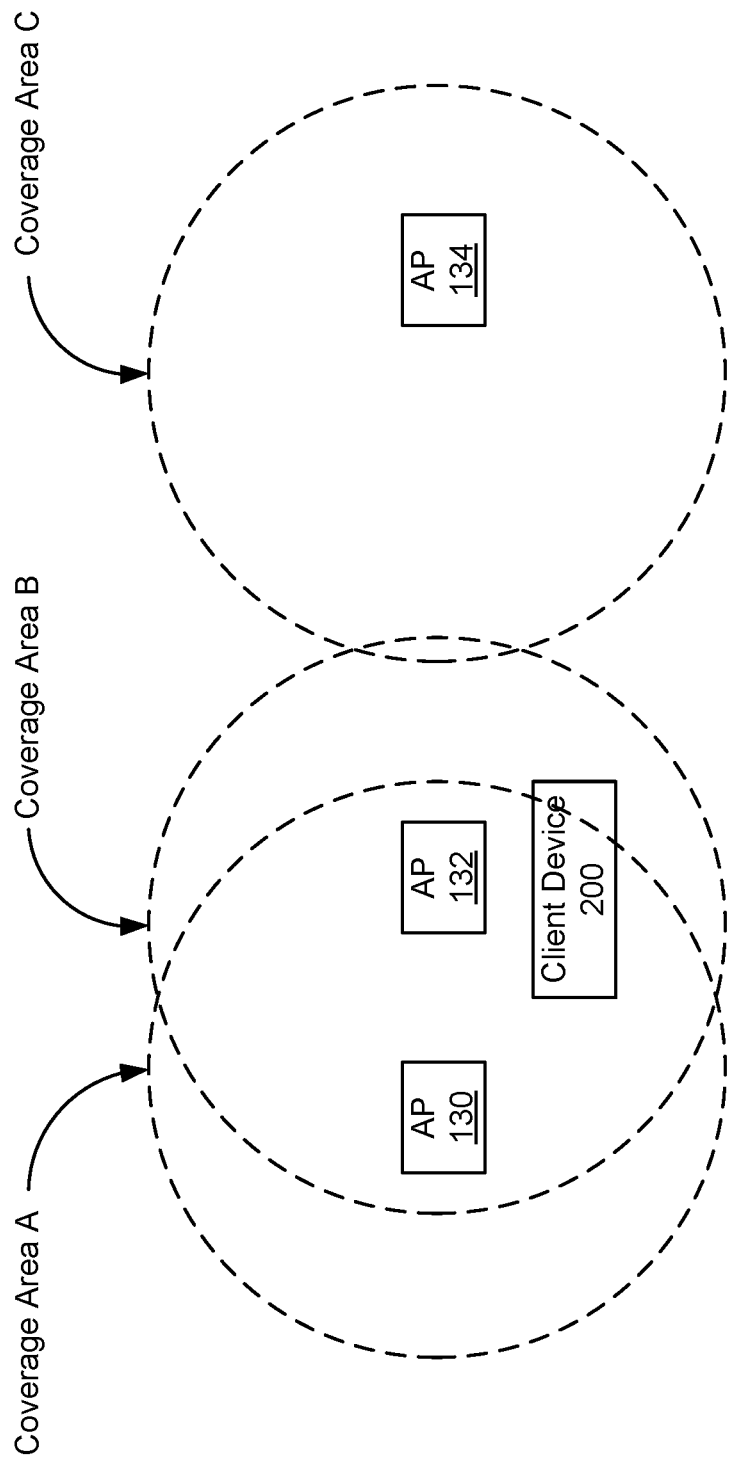
FIG. 2 illustrates an example scenario in which a client device roams in a conventional wireless device upgrade system.

Sometimes, a wireless network manager may perform a specific AP reboot to avoid the RF hole issue. Referring to FIG. 2, three example coverage areas (coverage areas A, B, and C) are shown, along with respective APs, e.g., AP 130, AP 132, and AP 134. APs 130 and 132 are neighbors, and whose coverages areas (A and B) overlap. The overlap of coverage areas A and B is such that a client device 200 can auto-roam to AP 130 if AP 132 is down (e.g., for an upgrade). In this example, the wireless network manager can locate AP 130 and AP 132, and trigger client device 200 to roam to AP 130. The wireless network manager may then reboot AP 132, and trigger client device 200 to roam back to AP 132 once AP 132 comes back online. Although client device connectivity is not lost, and the creation of an RF hole is avoided, as is downtime (since client device 200 is able to roam to another active AP), client device 200 is forced to roam to another AP, i.e., AP 130. It should be understood that when a client device, e.g., client device 200, roams to another AP, e.g., AP 130, client device 200 must re-associate with new AP 130, as well as renegotiate its packet keys (if encryption is enabled). Moreover, the 802.11 state, indicated by a BA agreement (involving a Block ACK session and Aggregation capacity negotiation) must also be renegotiated between client device 200 and new AP 130. This also results in an interruption to client device traffic.

Figure 3:
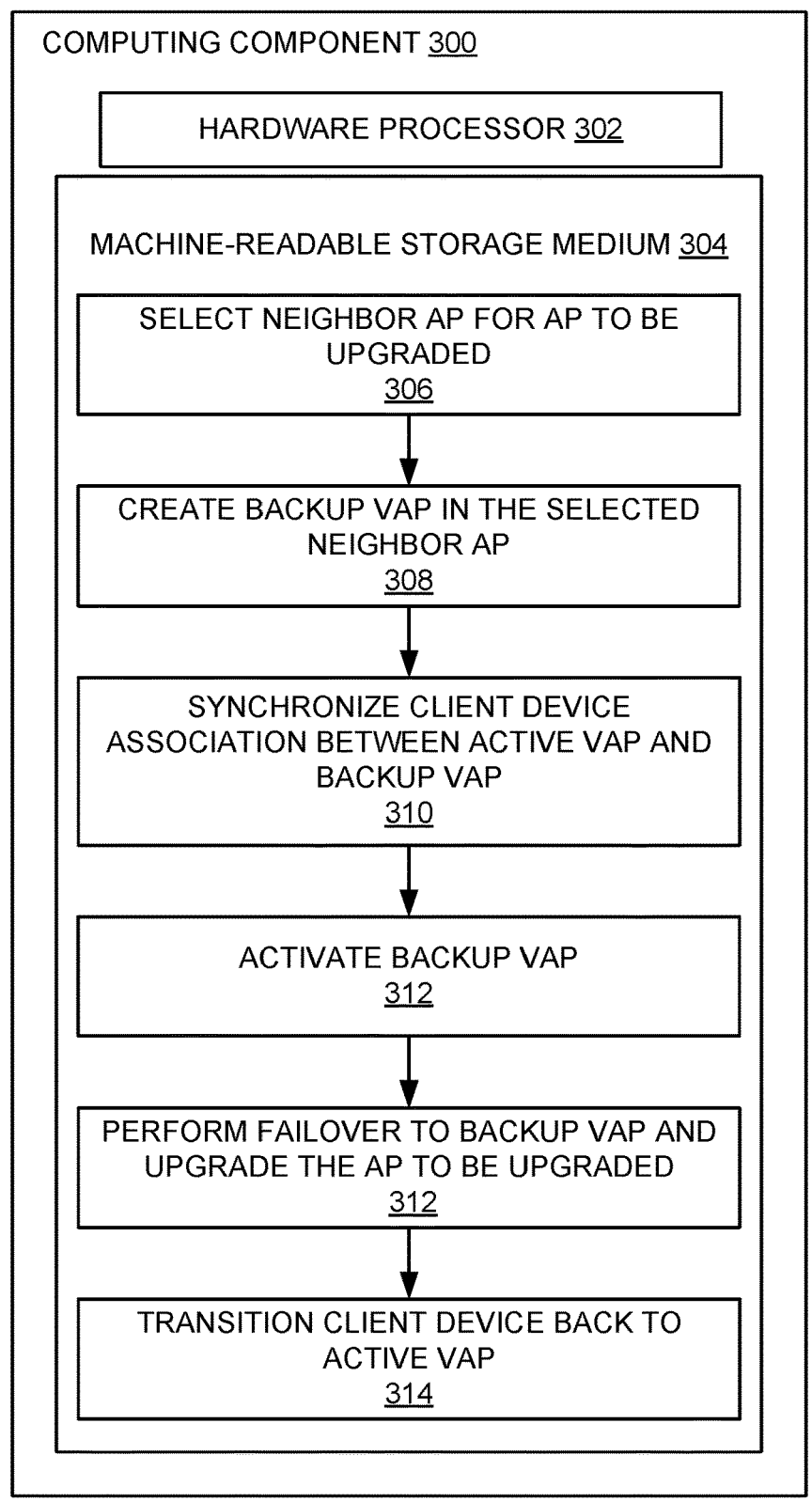
FIG. 3 illustrates an example computing component for effectuating seamless wireless device upgrade without downtime in accordance with one embodiment.

FIG. 3 is a block diagram of an example computing component or device 300 for separating radio chains between mission-critical devices and enterprise clients in accordance with one embodiment. Computing component 300 may be, for example, a server computer, a controller, or any other similar computing component capable of processing data. In the example implementation of FIG. 3, computing component 300 includes a hardware processor, 302, and machine-readable storage medium, 304. In some embodiments, computing component 300 may be an embodiment of a controller, e.g., any of controllers 102-108 (FIG. 1), respectively, or a component of wireless network 100 (FIG. 1), for example.

Hardware processor 302 may be one or more central processing units (CPUs), semiconductor-based microprocessors, and/or other hardware devices suitable for retrieval and execution of instructions stored in machine-readable storage medium, 304. Hardware processor 302 may fetch, decode, and execute instructions, such as instructions 300-316, to control processes or operations for upgrading an AP. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EE-PROM), a storage device, an optical disc, and the like. In some embodiments, machine-readable storage medium 304 may be a non-transitory storage medium, where the term "non-transitory" does not encompass transitory propagating signals. As described in detail below, machine-readable storage medium 304 may be encoded with executable instructions, for example, instructions 306-316.

Figure 4A:
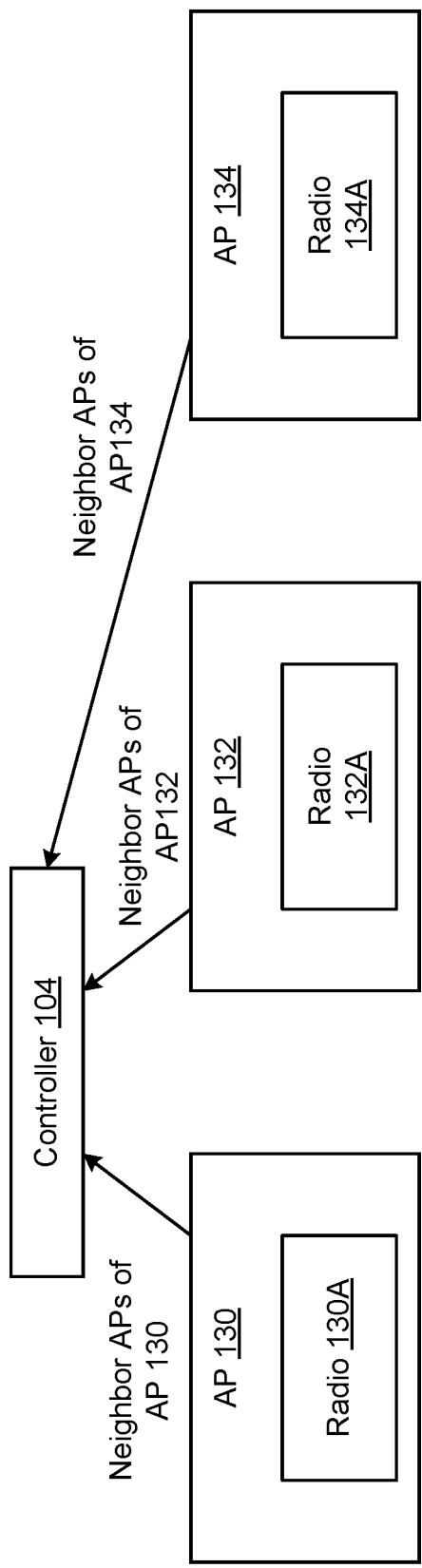
FIG. 4A illustrates an example of neighbor AP selection in accordance with one embodiment.

Hardware processor 302 may execute instruction 306 to select a neighbor AP for an AP to be upgraded. Selection of the neighbor AP may be based upon client device(s) and the active VAP of the AP to be upgraded. FIG. 4A illustrates this example selection of the neighbor AP in accordance with one embodiment. FIG. 4A shows three APs, AP 130, AP 132, and AP 134, each including in part, respective radios 130A, 132A, and 132A, each being controlled/managed by controller 140. In the event that AP 130 needs upgrading, controller 104 obtains information regarding neighbor APs of each of AP 130, AP 132, and AP 134. An AP may determine or identify its neighbors by, e.g., performing passive scanning to determine what client device traffic it can listen to, and determining what AP is serving that client device. In other words, a neighbor AP is one that could provide service to the client device(s) currently being served by the original AP.

Accordingly, in accordance with one embodiment, factors taken into consideration by a controller when selecting a neighbor AP can include, but are not limited to the following. First, a neighbor AP's signal strength should be above a roaming threshold that would result in a client device roaming to another (non-neighbor AP). Second, the neighbor AP should have enough radio chains for a second AP radio split in order to accommodate service to the requisite number of client devices. That is, the number of AP radio chains should be greater than or equal to the number of client device radio chains requiring support. Third, the neighbor AP should be able to listen to the active VAP of the original AP. It should be noted that other factors may be considered when selecting a neighbor AP, e.g., the client device traffic load of an AP, the target channel load on an AP, and/or other factors that may impact the ability of a selected neighbor AP to serve a client device(s). A controller, e.g., controller 104, may also have information regarding the air condition of each potential neighbor AP, an APs space deployment, and RF coverage map for one or more channels. In the example of FIG. 4A, controller 104 may select AP 132 to be the neighbor AP to AP 130 (which is to be upgraded). It should be noted that AP 132 is able to hear the client devices associated with AP 130, and as a result, those client devices that are associated with AP 130 may also be served by AP 132. It should also be noted that the AP upgrade procedure for AP 130 can be triggered.

It should be noted that APs, such as AP 130, AP 132, and AP 134 are enabled to implement VAPs, namely, support for one or more multiple distinct service set identifier (SSID) values over a single AP radio with unique media access control (MAC) addresses per SSID (i.e., basic SSID (BSSID)). As is known, an SSID is a field between 0 and 32 octets that may be included as an Information Element (IE) within management frames. In the context of the 802.11 standard, management frames supporting the SSID IE include the beacon, probe request/response, and association/reassociation request frames. In one embodiment, an AP supports VAPs using multiple BSSIDs. Each beacon or probe response may contain a single SSID IE. The AP sends beacons for each VAP that it supports at a beacon interval (e.g., 100 ms), using a unique BSSID for each VAP. The AP responds to probe requests for supported SSIDs (including a request for the broadcast SSID) with a probe response including the capabilities corresponding to each BSSID. In one embodiment, an AP may advertise up to a given number (e.g., 16) of beacons, each with a different BSSID to provide the VAP support. Each VAP may have a unique MAC address, and each beacon may have a network name.

Figure 4B:
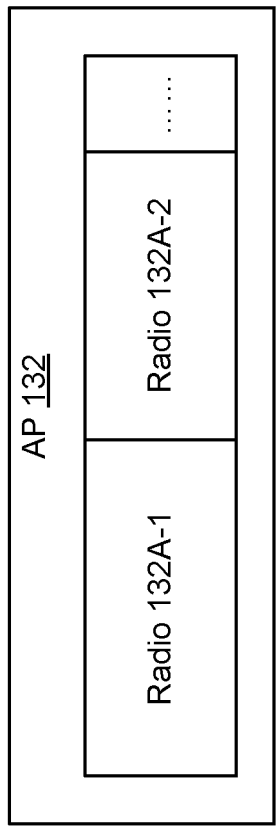
FIG. 4B illustrates an example of radio splitting in a selected neighbor AP in accordance with one embodiment.
Figure 4B:
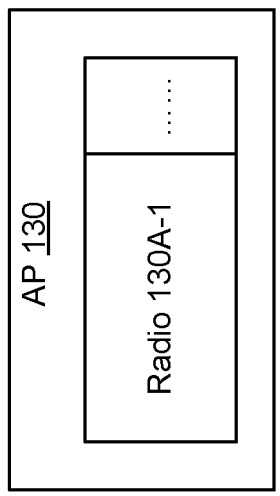

Referring back to FIG. 3, hardware processor 302 may execute instruction 308 to create a backup VAP in the selected neighbor AP. Referring to FIG. 4B, the respective radio resources of AP 130 and AP 132 are shown to be split into two or more radio chains, each forming a logical radio. FIG. 4B highlights one of the radio chains, Radio 130A-1 in AP 130, and Radios 132A-1 and 132A-2 in AP 132. Radio 130A-1 may be considered to be a primary radio operating on channel 1, and radio 132A-1 may be a secondary radio operating on channel 1 as well. Radio 132A-2 may be the primary radio of AP 132 operating on channel 2. It should be understood that references to channels herein, e.g., channels 1 and 2, are not meant to necessarily suggest actual WLAN channels, such as channels 1-14 that correspond to the 2.4 GHz band, although they can. Rather, the identifiers 1 and 2 can simply suggest, e.g., a first channel that differs from a second channel.

Figure 4C:
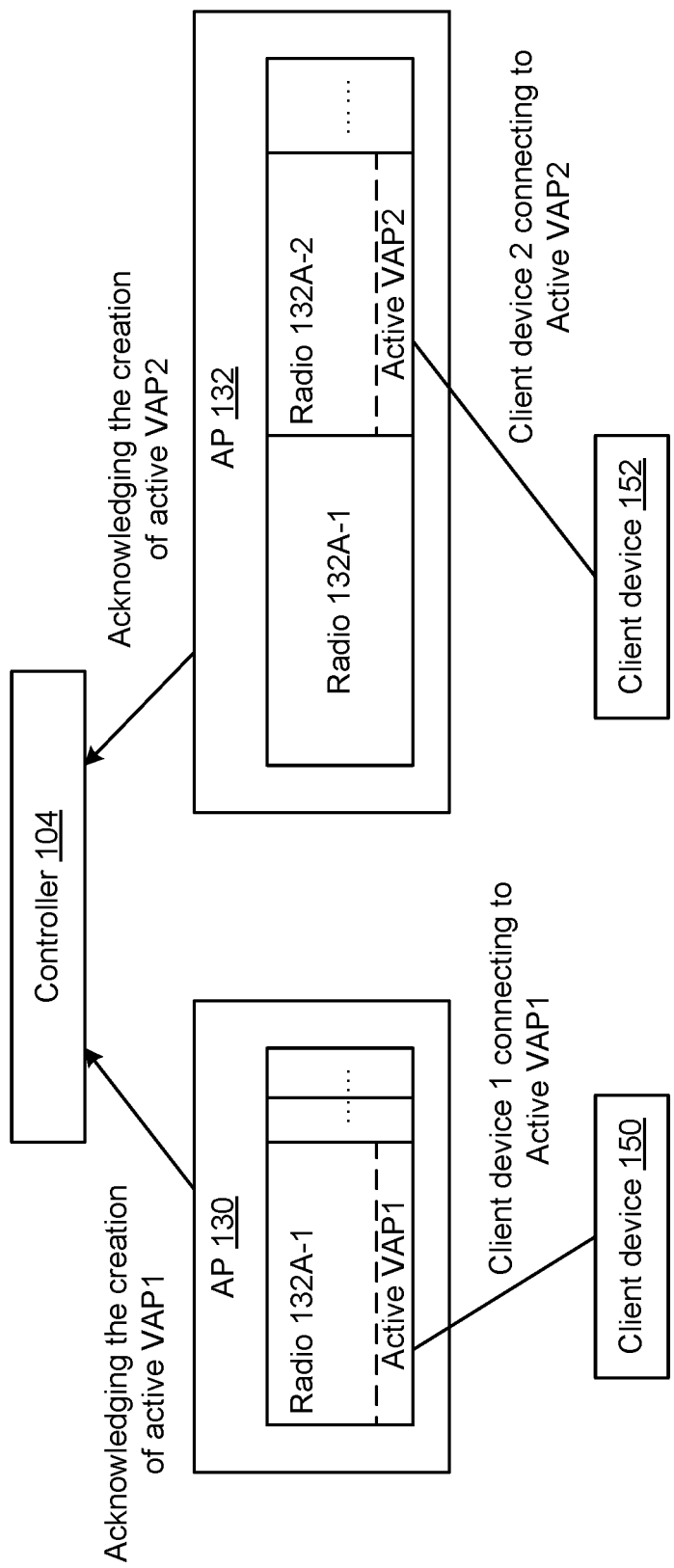
FIG. 4C illustrates an example of active VAP creation and client device connectivity to the active VAP in accordance with one embodiment.

FIG. 4C illustrates the implementation of active VAPs in radios 130A-1 and 132A-2. Upon creation of active VAP1 and active VAP2, APs 130 and 132 may acknowledge or inform controller 104 of the creation of these active VAPs. FIG. 4C further illustrates a first client device 150 associated with active VAP1 in AP 130, and a second client device 152 associated with active VAP2 in AP 132.

Figure 4D:
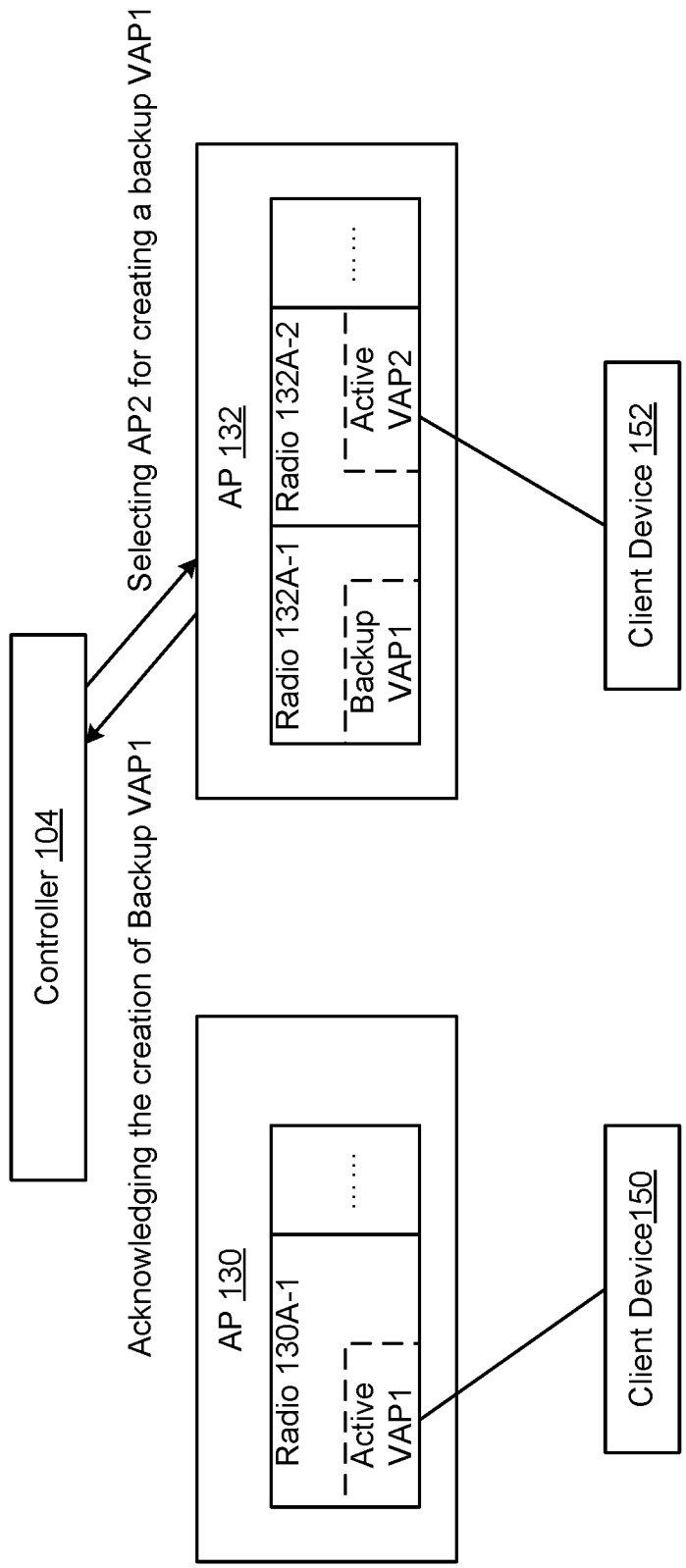
FIG. 4D illustrates an example of backup VAP creation in accordance with one embodiment.

FIG. 4D illustrates the creation of a backup VAP in AP 132. Pursuant to execution of instruction 306 (described above) to select a neighbor AP (AP 132), a backup VAP1 may be created. Backup VAP1 is shown as being operative on channel 1 in radio 132A-1 of AP 132. For example, controller 104 may assign backup VAP1 to channel 1 and active VAP2 to channel 2 in AP 132. It should be understood that radio 132A-2, which operates on channel 2 (i.e., a channel different from that on which radio 132A-1 operates), continues to serve clients devices such as client device 152 that are associated with its active VAP2, recalling active VAP2 has been created on primary radio 132A-2. By assigning radio 132A-1 (and backup VAP1) to channel 1, AP 132 is able to support those client devices supported by AP 130 (e.g., client device 150) that are associated with active VAP1 of radio 130A-1 that also operate on channel 1. Moreover, and as with the creation of active VAPs, upon creation of backup VAP1, an acknowledgement or indication that backup VAP1 was created can be transmitted to controller 104.

Figure 4E:
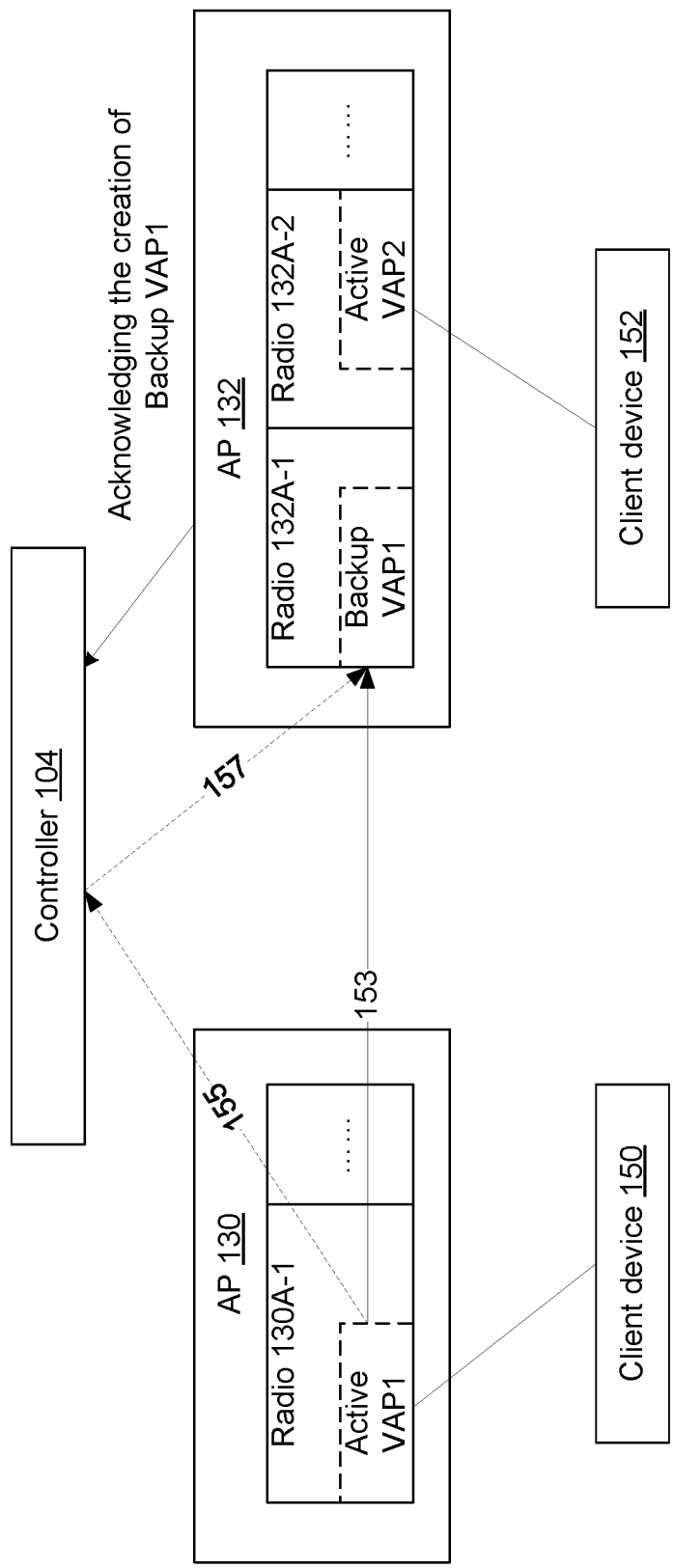
FIG. 4E illustrates an example of configuration and state synchronization between an active and backup VAP in accordance with one embodiment.

Referring back to FIG. 3, hardware processor 302 may execute instruction 310 to synchronize client device association between active and backup VAPs. Referring now to FIG. 4E, synchronizing client device association between active and backup VAPs is illustrated. In the example being described, the active VAP may be active VAP1 of radio 130A-1 in AP 130, and the backup VAP may be backup VAP1 of radio 132A-1 in AP 132. As illustrated in FIG. 4E, configuration and state information of backup VAP1 is synchronized with the configuration and state information of active VAP1. In this way, a client device, such as client device 150 that was originally associated with AP 130, can be associated with AP 132 (in particular, the backup VAP1 of AP 132) seamlessly, as will be described in greater detail below. That is, client device 150 may be associated with backup VAP1 of neighbor AP 132 without any interruption in service, experiencing downtime, or any other issues conventional wireless upgrade methods may present because the configuration and state of active VAP1 of AP 130 is reflected in backup VAP1 of AP 132.

In particular, once backup VAP1 is created in AP 132, a client entity may be internally created for facilitating the synchronization of information related to client device association between active VAP1 of AP 130 and backup VAP1 of AP 132. That is, information regarding each client device associated with an AP may be treated as a node, which can be referred to as a client entity. A secure channel may be used for this synchronization procedure as illustrated in FIG. 4E by arrow 153. Alternatively, synchronization between active VAP1 of AP 130 and backup VAP1 of AP 132 may occur via controller 104, as illustrated with dashed arrows 155 and 157. The information to be synchronized between active VAP1 of AP 130 and backup VAP1 of AP 132 may include, e.g., information regarding the configuration of active VAP1, association-related information, e.g., MAC address, Association ID, VAP capabilities, rate set, etc. Further still, this information may include security-related association information, such as, but not limited to the pairwise master key (PMK), and pairwise transient key (PTK). A PMK may be established between AP 130 and client device 150 for authentication of a user of client device 150 using, e.g., the Extensible Authentication Protocol (EAP), and a PTK may be established for authenticating AP 130 to client device 150. Further still, the synchronized information may include the newest/latest/most current (low-level) state information, such as the aforementioned beacon timestamp, TID sequence numbers, BA state/window, power save state, PN, etc.

Figure 4F:
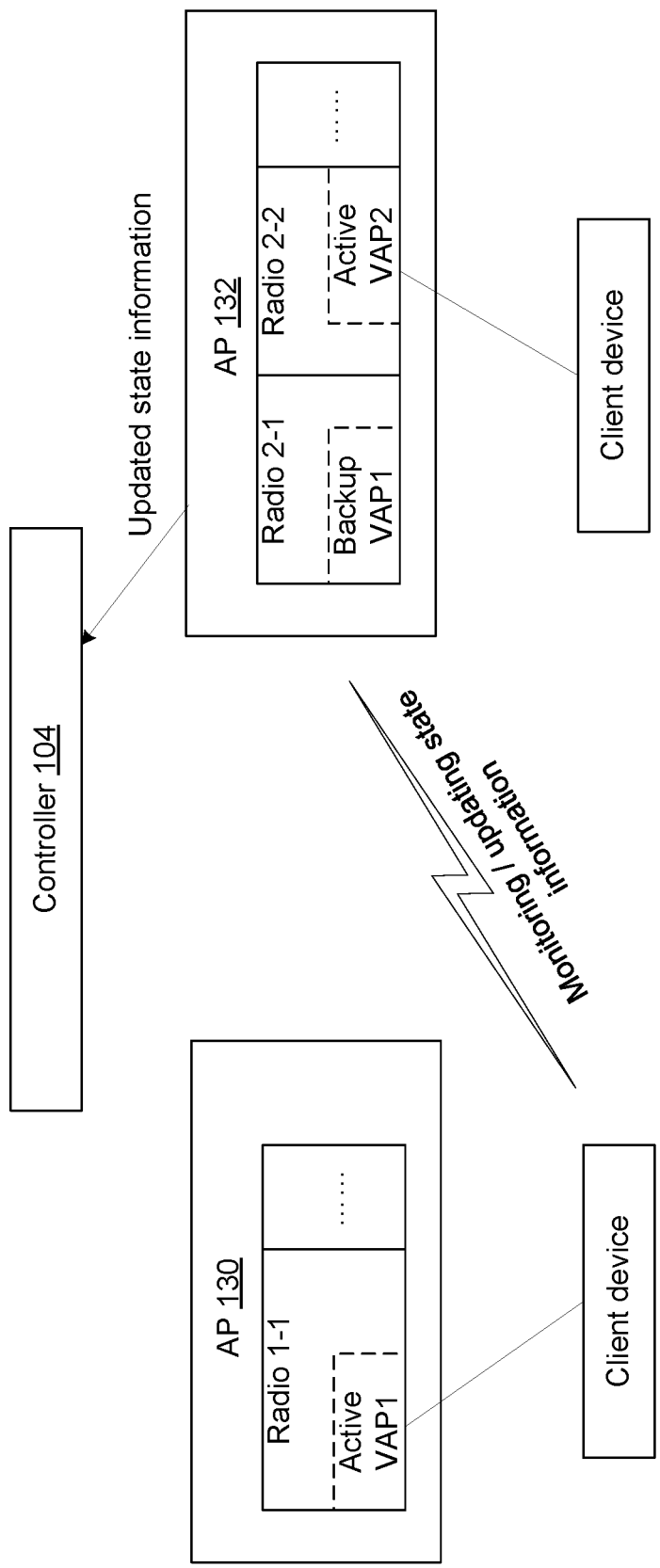
FIG. 4F illustrates an example of a selected neighbor AP monitoring and updating state information in accordance with one embodiment.

Referring back to FIG. 3, and once the configuration and state information from active VAP1 of AP 130 is synchronized with backup VAP1 of AP 132, hardware processor 302 may execute instruction 312 to activate the backup VAP. Referring to FIG. 4F, as previously discussed, the backup VAP in this example is backup VAP1 of AP 132. Activation of backup VAP1 of AP 132 may entail listening on its channel, channel 1—the same channel to which active VAP1 of AP 130 is assigned. As further illustrated in FIG. 4F, after the (first) synchronization process described above, backup VAP1 of AP 132 may listen in on channel 1 in order to monitor and push updated state information regarding active VAP1 of AP 130 to AP 130 and controller 104. It should be understood that both an AP and an AP in conjunction with its controller are able to set up a secure connection in accordance with different scenarios, e.g., mesh usage information regarding a computing network can be passed amongst the APs in that computing network. It should also be understood that in some embodiments, the aforementioned, low-level state information (e.g., time-critical state information, e.g., beacon timestamp) may be synchronized between APs directly, whereas high-level state information can be synchronized vis-à-vis the controller.

Figure 4G:
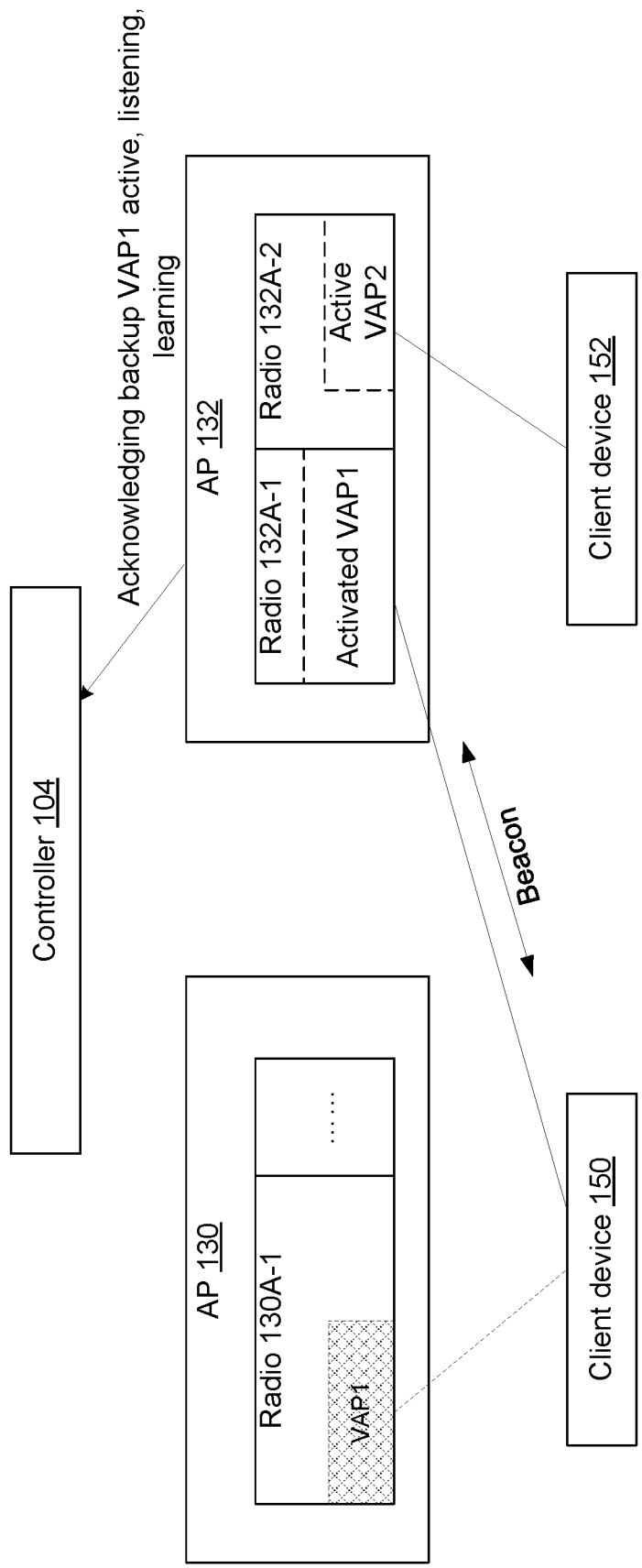
FIG. 4G illustrates an example of a failover to a backup VAP in accordance with one embodiment.

Referring back to FIG. 3, hardware processor 302 may execute instruction 314 to perform a failover to the backup VAP and upgrade the AP to be upgraded. In particular, and as illustrated in FIG. 4G, after controller 104 acknowledges activation of backup VAP1 of AP 132, and that backup VAP1 is listening and learning (i.e., monitoring and updating state information of active VAP1 of AP 130), controller 104 may initiate a reboot of active VAP1 of AP 130 or instruct active VAP1 of AP 130 to reboot after an image upgrade is performed. As described above, controller 104 may have copied to its backup flash or other memory, a new image for upgrading AP 130.

While VAP1 of AP 130 is down for upgrading and no longer active, backup VAP1 of AP 132 becomes "fully" active. That is, backup VAP1 of AP 132 can begin supporting client devices, e.g., client device 150 that was once supported by active VAP1 of AP 130. Because backup VAP1 of AP 132 continues (periodically or aperiodically) to listen to channel 1 and update its state information, backup VAP1 of AP 132 is aware of the latest or most current status of AP 130 just before active VAP1 of AP 130 goes down for upgrading. It should be understood that client device 152 may continue operating vis-à-vis active VAP2 of AP 132, while client device 150, unaware it is now being supported by activated VAP1 of AP 132, continues to operate. As illustrated in FIG. 4G, the previous connection between client device 150 and VAP1 of AP 130 over channel 1 (indicated by the hashed line) is shifted to activated backup VAP1 of AP 132. In other words, client device 150 can roam to AP 132 without re-associating with AP 132. As discussed above, activated backup VAP1 of AP 132 can transmit beacons, transmit data packets/frames to client 150, receive data packets/frames from client 150, etc., and from client device 150's perspective, it appears as though it is still being support by VAP1 of AP 130.

Figure 4H:
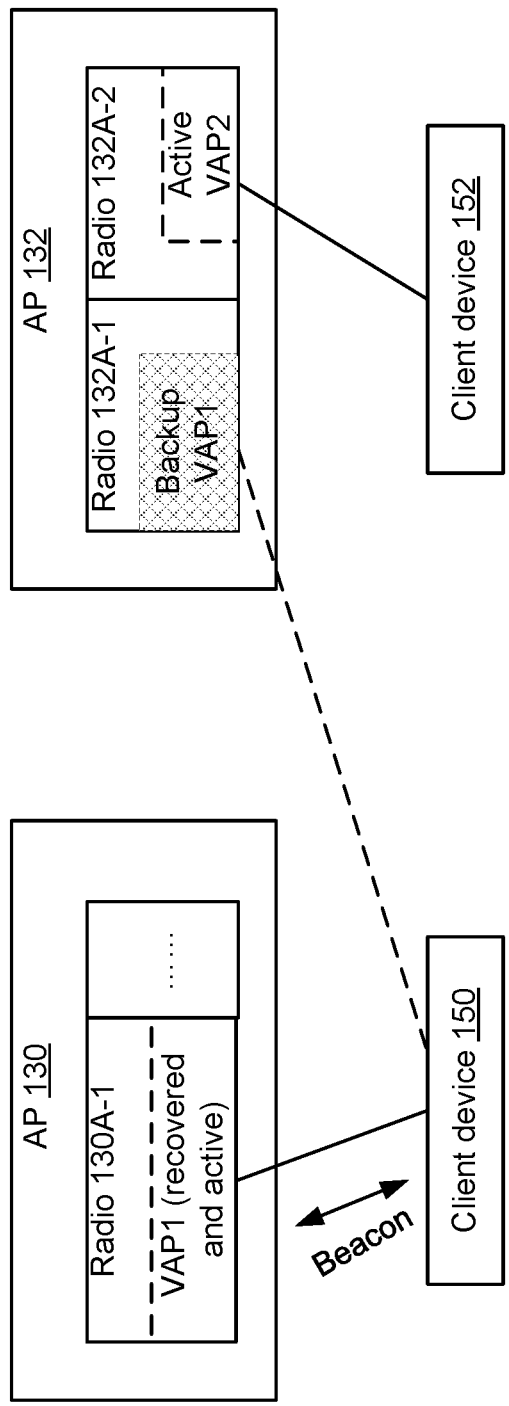
FIG. 4H illustrates an example transition back to an active VAP in accordance with one embodiment.

Referring back to FIG. 3, hardware processor 302 may execute instruction 314 to transition the client device back to the active VAP (i.e., the upgraded and re-activated VAP). Referring now to FIG. 4H, upon reactivating VAP1 of AP 130, a transition back to VAP1 of AP 130 can occur. Activated backup VAP1 of AP 132 may be deactivated and the associated radio or radio resource can be released. As illustrated in FIG. 4H, the previous connection between client device 150 and VAP1 of AP 132 over channel 1 (indicated by the hashed line) is shifted back to reactivated VAP1 of AP 130. Again, client device 150 can roam back to AP 130 without the need to engage in re-association with AP 130. Reactivated VAP1 of AP 130 can resume transmission of beacons, transmission of data packets/frames to client 150, reception of data packets/frames from client 150, etc. From client device 150's perspective, it appears as if VAP1 of AP 130 has been supporting client device 150 all along.

Upon completing these processes, and AP 130 has been upgraded, the processes can be repeated for other APs that may need to be upgraded. That is, controller 104 can pick another AP it controls, select a suitable neighbor AP, and the upgrade procedures described herein may be repeated.

Figure 5A:
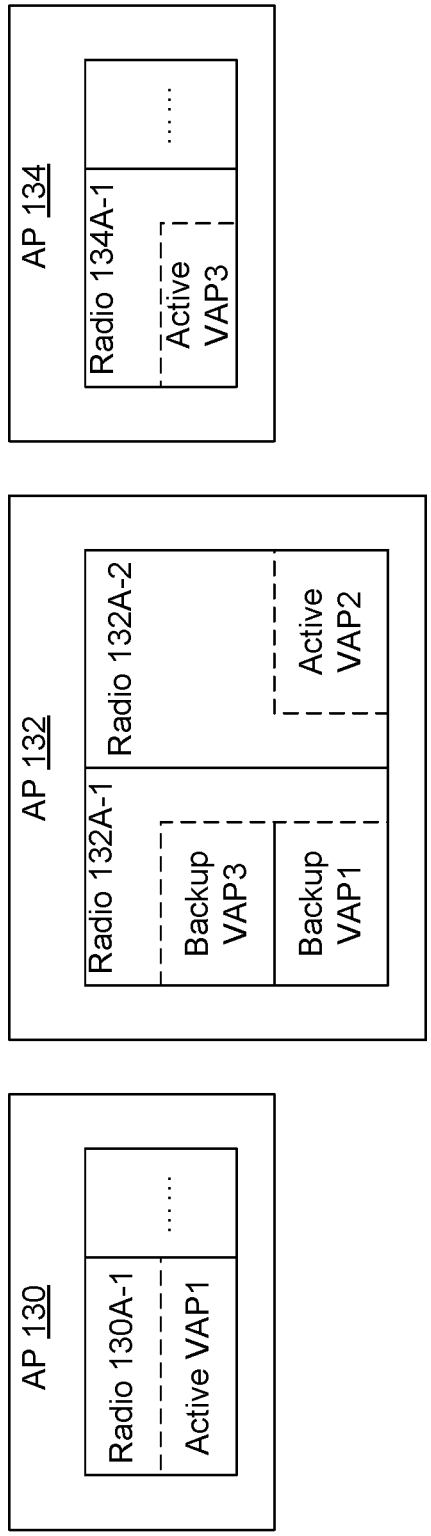
FIG. 5A illustrates an example AP radio split in accordance with one embodiment.
Figure 5B:
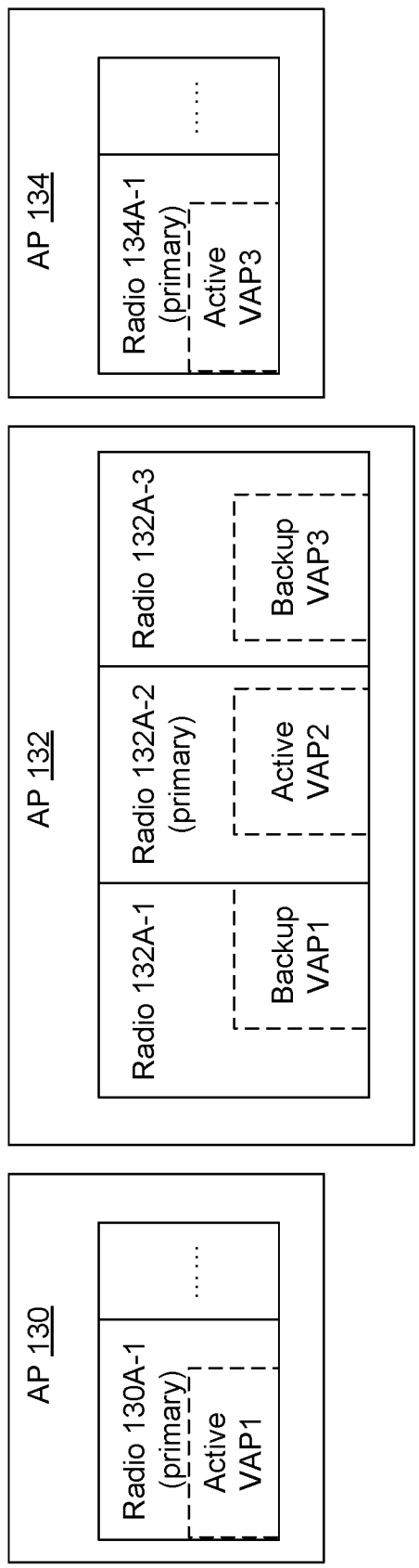
FIG. 5B illustrates an example AP radio split in accordance with another embodiment.

As discussed above, various embodiments of the present disclosure enable wireless device upgrades to be performed without encountering issues, such as downtime, RF holes, forced client device roaming, etc. by leveraging an APs ability to be split into multiple, logical radios. FIGS. 5A and 5B illustrate example AP radio splits contemplated by the various embodiments of the present application. It should be noted that AP radios can be split in other ways.

Referring to FIG. 5A, AP 130 may be split such that it has a primary radio 130A-1 operating on channel 1, and an active VAP1 that is part of primary radio 130A-1 also operating on channel 1. AP 132 may be split such that is has two radios, a primary radio 132A-2 (operating on channel 2) and a secondary radio 132A-1 (operating on channel 1). Primary radio 132A-2 may have an active VAP2 operating on channel 2, while secondary radio 132A-1 has two backup VAPs, a first backup VAP1 operating on channel 1, and a second backup VAP3 operating on channel 3. AP 134 may also be split into multiple logical radios, including a primary radio 134A-1 that has an active VAP3 operating on channel 3. Thus, in this example, AP 132 is capable of acting as a neighbor AP to AP 130.

It should be noted that AP 130 and AP 134 are operating on the same channel, channel 1, but their coverage does not overlap, or overlaps only slightly (see FIG. 2), thereby avoiding interference from each other as non-neighbor APs. It should also be noted that typically, prior to splitting radios, AP 130 and AP 132 may generally operate on different channels (again to reduce or negate any interference). However, as described above, upon splitting radios of a neighbor AP and creating one or more backup VAPs in that neighbor AP, its controller (not shown in FIG. 5A) assigns at least one backup VAP to the same channel as the AP to be upgraded.

FIG. 5B illustrates another example of splitting AP radios. Similar to the example illustrated in FIG. 5A, AP 130 may be split such that it has a primary radio 130A-1 operating on channel 1, and an active VAP1 that is part of primary radio 130A-1 operating on channel 1. AP 134 may also be split into multiple logical radios, including a primary radio 134A-1 that has an active VAP3 operating on channel 3. However, AP 132, in this example, may be split into three logical radios, secondary radio 132A-1 operating on channel 1, secondary radio 132-3 operating on channel 3, and primary radio 132A-2 operating on channel 2. Secondary radios 132A-1 and 132-3 may have backup VAPs created therein, i.e., backup VAP1 operating on channel 1 and backup VAP3 operating on channel 3, respectively. Primary radio 132A-2 may have an active VAP2 operating on channel 2. Due to the manner in which AP 132 splits its radios, AP 132 can be a neighbor AP for AP 130 as well as a neighbor AP for AP 134. Client devices (not shown in FIG. 5B) that are associated with AP 132 may continue receiving service/support from AP 132 vis-à-vis active VAP2 of primary radio 132A-2.

Various embodiments of the present disclosure enable wireless devices, such as APs to be upgraded with a seamless failover to another AP, and which allows for client device roaming without the need to re-associate with the new AP. Moreover, client device traffic need not be interrupted during an upgrade. Client devices have no requirements to enable the upgrading of wireless devices, and no extra hardware in the network, e.g., wireless network 100 (FIG. 1) is needed. Generally, the number of radio chains of APs exceed that of client devices, and extra radio chains may be identified and used to create backup VAPs as described herein. Moreover, an active VAP and backup VAP pair can operate in relay mode, i.e., active and backup VAPs do not transmit at the same time, providing another mechanism for avoiding interference.

Figure 6:
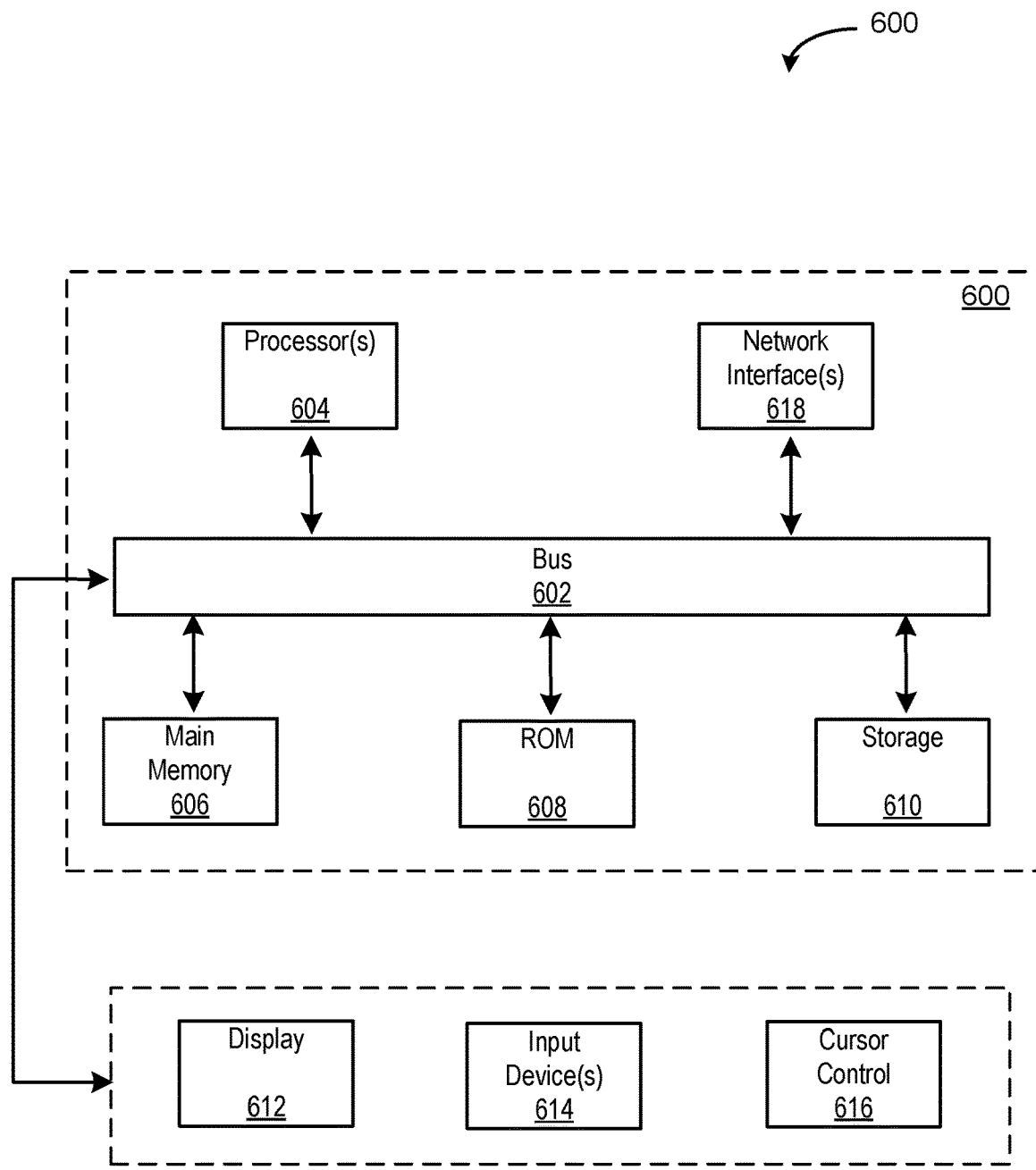
FIG. 6 illustrates an example computing component in which various embodiments described herein may be implemented.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A method, comprising:

selecting, by a network controller, a neighbor access point (AP) for an AP to be upgraded;

creating a backup virtual AP (VAP) in the selected neighbor AP by splitting one or more radios of the neighbor AP into two or more logical radios, wherein the backup VAP is created within one of the two or more logical radios;

synchronizing client device association between an active VAP of the AP to be upgraded and the backup VAP;

activating the backup VAP;

performing a failover to the backup VAP and upgrading the AP to be upgraded; and transitioning one or more client devices from the backup VAP to the active VAP.

2. The method of claim 1, wherein selection of the neighbor AP is based upon an ability of the neighbor AP to support the one or more client devices currently supported by the AP to be upgraded.

3. The method of claim 2, wherein the ability of the neighbor AP to support the one or more client devices comprises at least one of the neighbor AP having a signal strength greater than a roaming threshold of the one or more client devices, the neighbor AP having a number of radio chains for the backup VAP that is equal to or exceeds a number of client device radio chains, and the neighbor AP being able to listen to traffic associated with the one or more client devices.

4. The method of claim 1, further comprising assigning the backup VAP to a first channel, the first channel corresponding to a channel used by the active VAP to support the one or more client devices.

5. The method of claim 1, wherein synchronizing client device association between the active VAP and the backup VAP comprises obtaining configuration and state information associated with the active VAP from the active VAP over a secure channel between the active VAP and the backup VAP or via the network controller.

6. The method of claim 5, further comprising updating the configuration and state information of the backup VAP with the configuration and state information associated with the active VAP.

7. The method of claim 5, wherein the configuration and state information comprises at least one of a configuration of the active VAP, association information including at least one of a media access control (MAC) address, an association ID, a rate set, security association information, and latest state information comprising a beacon timestamp, a traffic identifier sequence number, a block acknowledgement state, a power save state, and packet numbers.

8. The method of claim 1, further comprising continually monitoring, by the neighbor AP, state information of the active VAP, and updating state information of the backup VAP commensurate with the monitored state information of the active VAP after synchronizing the client device association.

9. The method of claim 1, further comprising initiating roaming of the one or more client devices supported by the active VAP to the backup VAP without re-associating the one or more client devices with the neighbor AP.

10. The method of claim 1, wherein transitioning the one or more client devices back to the active VAP comprises initiating roaming of the one or more client devices supported by the backup VAP to the active VAP, the active VAP having been reactivated in the upgraded AP.

11. A wireless network, comprising:

first and second access points (APs); and a controller controlling the first and second APs, wherein the controller is adapted to:

select the second AP to be a neighbor AP for the first AP, wherein the first AP is to be upgraded;

create a backup virtual AP (VAP) in the second AP to support one or more client devices associated with the first AP, the backup VAP being created in a first logical radio of two of more logical radios made by splitting one or more radios of the neighbor AP into two or more logical radios;

synchronize configuration and state information between the backup VAP and an active VAP of the first AP currently supporting the one or more client devices;

enabling the backup VAP to support the one or more client devices while the first AP is being upgraded such that the one or more client devices appear to be supported by the active VAP of the first AP.

12. The wireless network of claim 11, wherein the controller comprises at least one of a physical, hardware controller operative in the wireless network, and a virtual controller.

13. The wireless network of claim 11, wherein the controller assigns the backup VAP of the second AP to a channel being used by the active VAP of the first AP.

14. The wireless network of claim 13, wherein the controller assigns an active VAP of a second logical radio of the two or more logical radios to a channel other than the channel to which the backup VAP of the second AP is assigned.

15. The wireless network of claim 11, wherein the backup VAP of the second AP continually monitors and updates state information in accordance with the latest state information of the active VAP of the first AP until upgrading of the first AP commences.

16. The wireless network of claim 11, wherein upon completion of the upgrade to the first AP, the controller reactivates the active VAP of the first AP.

17. The wireless network of claim 16, wherein upon completion of the upgrade to the first AP, the controller transitions the one or more client devices from the backup VAP of the second AP back to the active VAP of the first AP.

18. The wireless network of claim 17, wherein upon completion of the upgrade to the first AP, the backup VAP of the second AP is deactivated to free radio resources of the second AP.

* * * * *